United States Patent

Chriswell et al.

[11] Patent Number: 5,808,188
[45] Date of Patent: Sep. 15, 1998

[54] FLOWBENCH AND AIR FLOW MEASUREMENT AND CALIBRATION PROCEDURE

[76] Inventors: Shawn Darrell Chriswell, 2607 Stratford La.; Darrell Ray Chriswell, 5650 Boulder Hills Dr., both of Longmont, Colo. 80503

[21] Appl. No.: 640,510

[22] Filed: May 1, 1996

[51] Int. Cl.$^6$ .................................................. G01M 15/00
[52] U.S. Cl. ........................ 73/118.2; 73/196; 73/861.52; 73/861.61
[58] Field of Search ............................ 73/3, 117.1, 118.2, 73/196, 861.52, 861.61, 861.62, 861.63, 861.64

[56] References Cited

U.S. PATENT DOCUMENTS

| | | | |
|---|---|---|---|
| 3,469,442 | 9/1969 | Brueckner | 73/118 |
| 3,667,494 | 6/1972 | Haase | 137/100 |
| 4,050,428 | 9/1977 | Masaki | 123/119 |
| 4,574,617 | 3/1986 | Hetznecker | 73/37.9 |
| 4,996,875 | 3/1991 | Baer et al. | 73/119 R |
| 5,010,224 | 4/1991 | Shirley | 219/69.17 |
| 5,072,613 | 12/1991 | Baer et al. | 73/119 R |
| 5,569,846 | 10/1996 | Grenkowitz et al. | 73/117.1 |

OTHER PUBLICATIONS

Measurement of Gas Flow by Means of Critical Flow Venturi Nozzles; ASME/ANSI MFC —7M–1987.
Performance Racing Industry, vol. 10, No. 8, Aug. 1995, p. 41; Superflo® Flowbench.

*Primary Examiner*—Elizabeth L. Dougherty
*Assistant Examiner*—Eric S. McCall
*Attorney, Agent, or Firm*—Rick Martin

[57] ABSTRACT

A pneumatic system for comparing air flow characteristics of different unknown flow restrictions. The first head or piece of equipment and a base orifice are installed in turn on the flowbench and air flow rates are measured for each using a critical flow venturi nozzle. The base orifice flow rate is referred to as $p_1$. The first head or piece of equipment flow rate is referred to as $p_2$. A small orifice is identified which equates in flow rate to the first head or piece of equipment, $p=p_2$. A flow coefficient can be calculated were $R_1=p_2/p_1$. A second head or piece of equipment, for comparison, is then flow tested at the same location or at another location under different atmospheric conditions. The ratio of the first condition flow rates $p_2/p_1$ multiplied by the base orifice flow rate at condition two, $p_3$, allows calculation of a theoretical flow rate for the first small orifice (or first head or piece of equipment) at condition two, $p_4$. Once measured, the flow rate of the second head or piece of equipment at condition two (p) may be compared to the theoretical first small orifice flow rate at condition two, ($p_4$), to determine relative performance of both heads or pieces of equipment at condition two or as between each other either at condition one or condition two. In an alternate embodiment, the system compares the relative air flow characteristics of different race engines.

47 Claims, 5 Drawing Sheets

PRESSURE TEST DATA

| NAME: | | DATE: | | | | NOZZLE DIAMETER: ⌀.800 | | |
|---|---|---|---|---|---|---|---|---|

TEST 1:

| TIME:<br>TEMP: | ⌀1.100 | ⌀1.120 | ⌀1.140 | ⌀1.160 | ⌀1.180 | ⌀1.200 | BASE<br>STANDARD | %<br>DIFF. | POINT<br>SPAN |
|---|---|---|---|---|---|---|---|---|---|
| $H_2O''$ | 24.3 | 24.7 | 25.8 | 26.5 | 27.8 | 27.6 | 42.0 | 7.9 | 3.3 |
| % | 57.8 | 58.8 | 61.4 | 63.1 | 66.2 | 65.7 | | | |

TEST 2:

| TIME:<br>TEMP: | ⌀1.100 | ⌀1.120 | ⌀1.140 | ⌀1.160 | ⌀1.180 | ⌀1.200 | BASE<br>STANDARD | %<br>DIFF. | POINT<br>SPAN |
|---|---|---|---|---|---|---|---|---|---|
| $H_2O''$ | 24.0 | 24.6 | 24.9 | 25.6 | 26.9 | 27.1 | 43.1 | 7.3 | 3.1 |
| % | 55.6 | 57.0 | 57.8 | 59.4 | 62.4 | 62.9 | | | |

TEST 3:

| TIME:<br>TEMP: | ⌀1.100 | ⌀1.120 | ⌀1.140 | ⌀1.160 | ⌀1.180 | ⌀1.200 | BASE<br>STANDARD | %<br>DIFF. | POINT<br>SPAN |
|---|---|---|---|---|---|---|---|---|---|
| $H_2O''$ | 23.7 | 24.2 | 25.1 | 25.6 | 25.9 | 26.8 | 41.6 | 7.4 | 3.1 |
| % | 57.0 | 58.2 | 60.3 | 61.5 | 62.2 | 64.4 | | | |

FLOWBENCH AND AIR FLOW MEASUREMENT AND CALIBRATION PROCEDURE

FIELD OF INVENTION

The present invention relates to a flowbench and a procedure to calibrate a critical flow venturi nozzle. An air flow measurement allows a comparison of known and unknown air flow restrictions under different atmospheric conditions, thereby enabling a simple method to compare different component and engine air flow efficiencies.

BACKGROUND OF THE INVENTION

Means for measuring air flow through various types and pieces of equipment for control and comparison under a single atmospheric state are widely used and well known. Representative of the art is U.S. Pat. No. 3,667,494 (1972) to Haase which describes a mass air-flow-sensitive fuel control comprising a high-gain venturi in the air induction passage for measuring mass air flow.

U.S. Pat. No. 4,050,428 (1977) to Masaki teaches a device which measures differential pressure between a carburetor venturi and an upstream point and ambient pressure and temperature. Electric signals fed to a computing means produces an output analogous to the air-flow rate.

U.S. Pat. No. 3,469,442 (1967) to Brueckner teaches an apparatus for calibrating carburetors comprising a plurality of sonic nozzles which establish a finite mass-flow rate for the particular setting at which the carburetor is being calibrated.

U.S. Pat. No. 5,010,224 (1991) to Shirley teaches an improved manufacturing method for production of small orifices in selected work pieces. The measurement of pressure drop through the work piece is taught by visual display using a pressure gauge.

U.S. Pat. No. 4,574,617 (1986) to Hetznecker teaches a pneumatic gauging system for determining the size of test restrictions by use of a maximum restriction standard connected through an indicator to a source of pneumatic pressure. A minimum restriction standard is also connected through the indicator to the source of pneumatic pressure. A test restriction is also connected and alternative readings are taken of each restriction by manipulation of a value.

The closest prior art is a Superflow™ flowbench used to measure the air flow rates of engine components, see *Performance Racing Industry* magazine, Volume 10, November 8, August 1995, page 41. In order to derive a flow rate, the operator must accurately measure and record several atmospheric variables at the same time that the air flow measurement for the equipment is taken. The air flow measurement is actually taken from an inclined manometer mounted on the device. These variables include temperature, pressure, humidity. These atmospheric variables are then used in the calculation with the reading from the inclined manometer to derive the air flow rate of the equipment in cubic feet per minute. This procedure must be repeated for each piece of equipment being tested. This equipment is very costly and does not easily lend itself to comparisons of performance between engines or components at different locations.

Each of these devices measures air flow through various restrictions. These measurements are used to gauge the performance of each restriction. The measurements also serve to calibrate each restriction against a known standard. Each method or device is complex and relies upon specialized equipment in order to perform as claimed. The devices are not configured to allow simple yet accurate comparison of flow characteristics of differing pieces of equipment at differing atmospheric conditions.

The present invention provides a simple means of accurately and repeatably comparing the air flow characteristics of a component or piece of equipment at one set of atmospheric conditions to another component or piece of equipment under different atmospheric conditions at another location. It also allows calculation of the theoretical performance of a component or piece of equipment under a second set of atmospheric conditions which allows it to be compared to another component at the second atmospheric condition. This application is especially useful in benchmarking various internal combustion engines in various geographic locations.

SUMMARY OF THE INVENTION

One main aspect of the present invention is to provide a simple means of accurately comparing the flow characteristics of different pieces of equipment under different atmospheric conditions.

Another aspect of the present invention is to provide a means of flow characteristic comparison with a high level of repeatability.

Another aspect of the present invention is to provide a means of flow characteristic comparison which is portable.

Another aspect of the present invention is to provide a means of flow characteristic comparison which is reliable and accurate under different atmospheric conditions.

Other aspects of this invention will appear from the following description and appended claims, reference being made to the accompanying drawings forming a part of this specification wherein like reference characters designate corresponding parts in the several views.

The present invention comprises a pneumatic source connected to an ASME/ANSI critical flow venturi nozzle ("venturi nozzle"). In series with the venturi nozzle is a flow table upon which the orifices and the equipment to be tested are placed. Under the first atmospheric condition, a base orifice $O_1$ is placed on the flow table. The pneumatic source is then started which causes an air flow through the venturi nozzle and the base orifice $O_1$. Once the system has stabilized, a reading is taken from a sensing and measuring means attached to the venturi nozzle to determine the air flow, referred to as $p_1$. The source of pneumatic pressure is then stopped and the base orifice $O_1$ is removed. The equipment for which the air flow characteristic is desired (such as an engine head) is then placed upon the flow table and the source of pneumatic pressure is restarted. Once the system has stabilized, a reading is taken from the measuring means attached to the venturi nozzle, referred to as $p_2$. The ratio (or percentage) of $p_2/p_1=R_1$ is calculated.

In order to make the comparison, a second piece of equipment (a second engine head, for example) is placed on an identical flow bench at another location, presumably under different atmospheric conditions. The pneumatic source is started and allowed to stabilize. A reading is taken from the measuring means of the venturi nozzle, referred to simply as p. After the equipment is tested, it is removed from the flow table. A base orifice $O_1$ (identical to the first) is then placed on the flow table and the pneumatic source is started. This gives another measured air flow rate through the venturi nozzle, referred to as $p_3$. The ratio (or percentage) of $p/p_3=R_2$ is calculated.

The various air flow rates are mathematically related by the equation, $p_4=p_3p_2/p_1$. This equation is used to predict the theoretical characteristics of the first piece of equipment under the second set of atmospheric conditions, $p_4$, which may then be compared to the flow rate for the second piece of equipment, p, at the second location.

A simplified calibration procedure calls for creating an orifice which equates in air flow rate to $p_2$. This orifice is then identified from an existing set of orifices or is duplicated by manufacturing at the second test site since it is merely a precisely drilled hole. The orifice becomes the benchmark to which the second piece of equipment is compared to establish relative performance of each piece of equipment to the other(s).

One economically beneficial application of the present invention is to take a race car engine intake manifold in Georgia and inexpensively compare its throughput to a similar intake manifold in Denver.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENT

Figure 1:
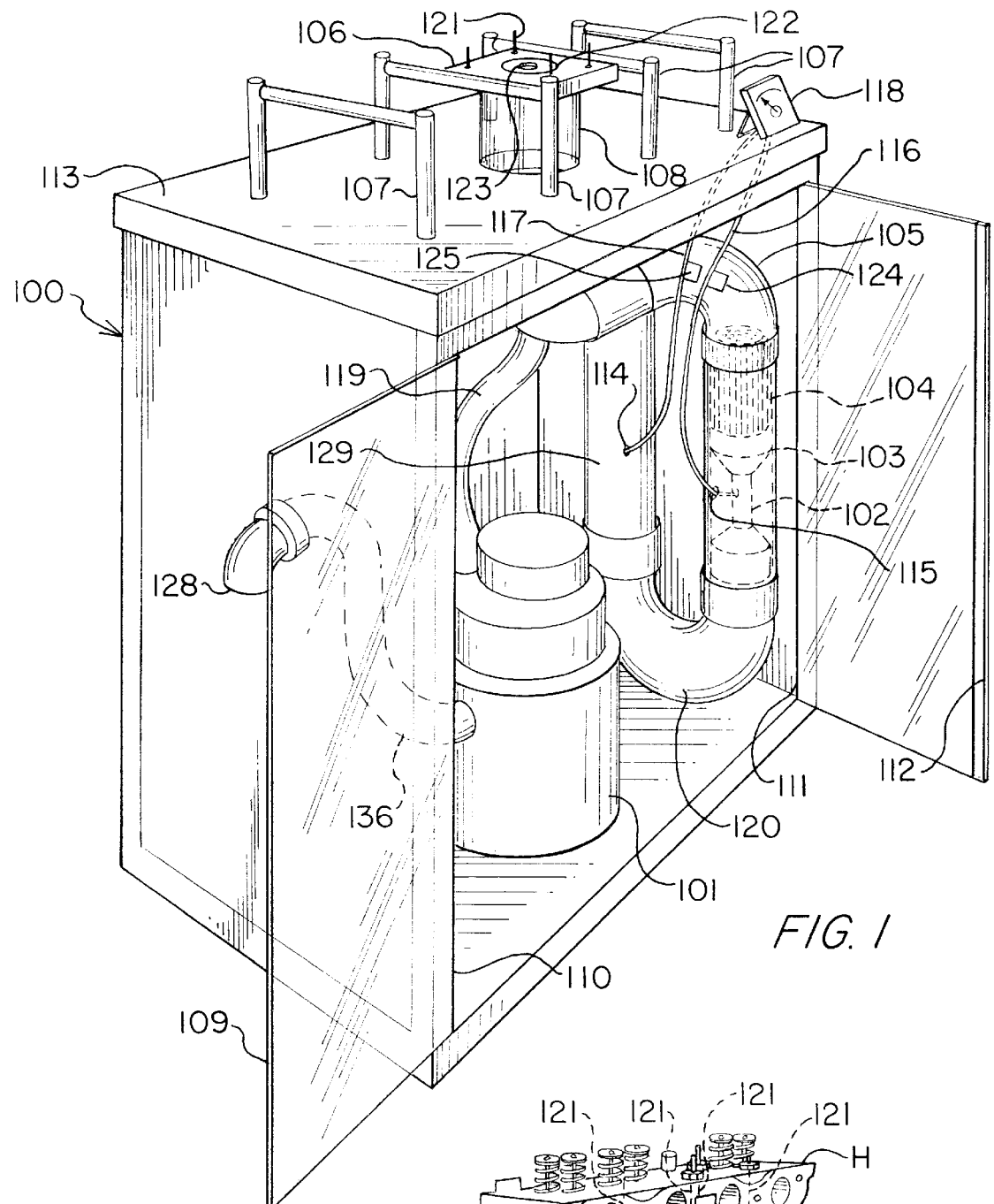
FIG. 1 is a perspective view of the flowbench.

Referring first to FIG. 1 depicting a perspective view of the flowbench 100, pneumatic source 101 is connected via pipe 119 and pipe 120 to the critical flow venturi nozzle 102. Critical flow venturi nozzle 102 is a restriction standard means. The critical flow venturi nozzle 102 is of the type described in the publication ASME/ANSI MFC-7M-1987 entitled *Measurement of Gas Flow by Means of Critical Flow Venturi Nozzles.* Contained within the straight pipe housing upstream of the critical flow venturi nozzle 102 is a debris screen 103 and flow straightener 104. This assembly is connected to adjustable pipe 108. Located atop adjustable pipe 108 is flow table 106 (support means). Adjustable pipe 108 is slidably installed within top 113. This allows flow table 106 to be adjusted up or down to allow an air tight connection to the equipment to be flow tested. Also located on the top 113, are support structures 107. The equipment to be flow tested is placed upon the support structures 107 to permit connection from below of the equipment to the flow table 106 by bolts 121.

Low pressure port 115 is attached to the throat of the critical flow venturi nozzle 102. High pressure port 114 is installed in pipe 129. Pneumatic signals are sensed via the high pressure sensing line 117 and low pressure sensing line 116. High pressure sensing line 117 and low pressure sensing line 116 are attached to a pressure sensing device such as a digital manometer 118. Digital manometer 118 senses the differential pressure between the low pressure port 115 and the high pressure port 114. Snubbers 124 and 125 are installed in each sensing line to dampen pulses of the pneumatic signal from the ports. Digital manometer 118 gives a digital reading of the pressure differential. By calculation the air flow through the critical flow venturi nozzle 102 is computed.

Figure 2:
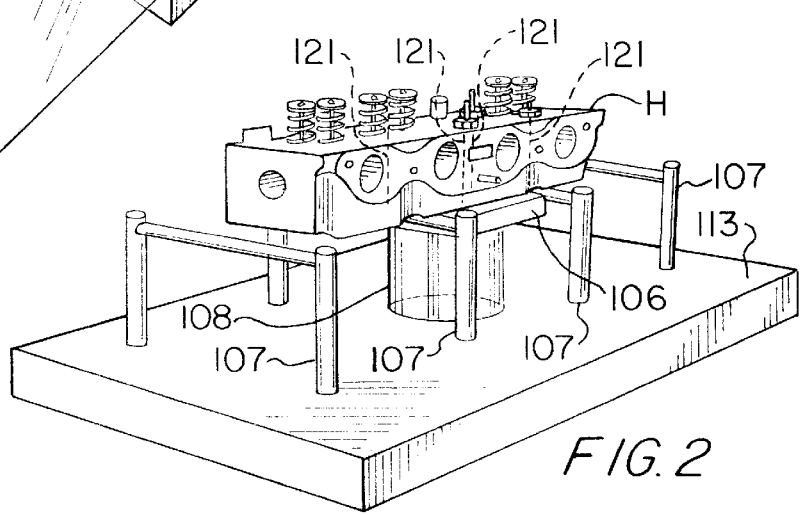
FIG. 2 is a perspective view of the top of the flowbench of FIG. 1 having an engine head ready for testing.
Figure 3:
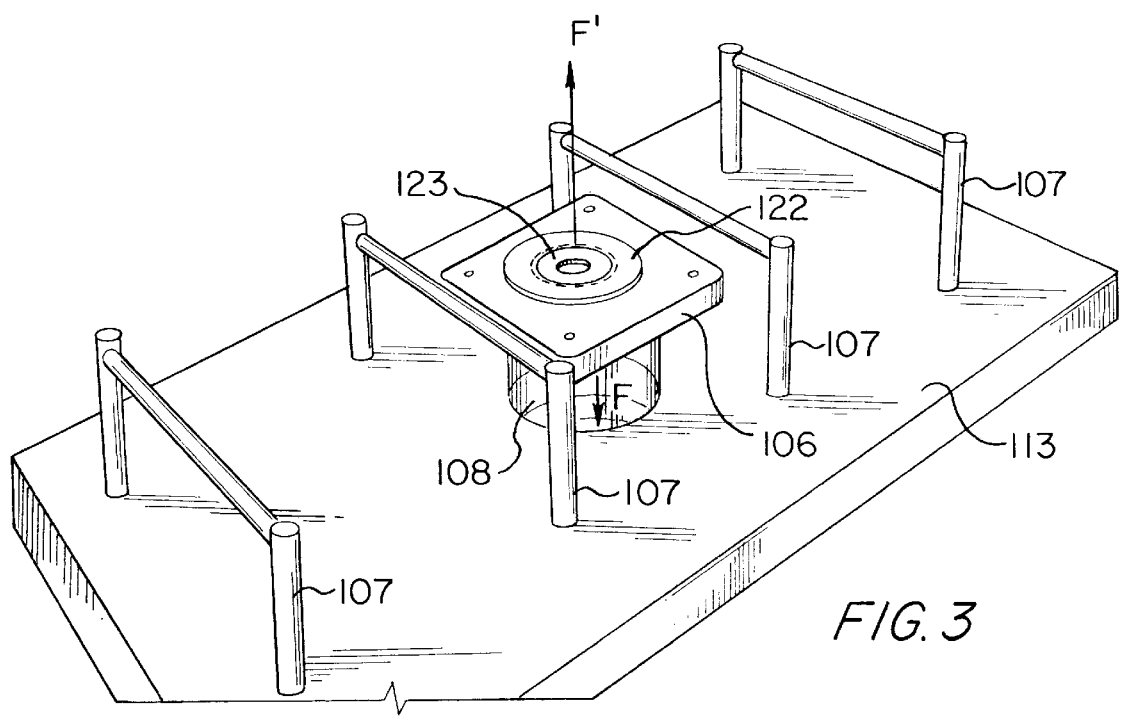
FIG. 3 is a perspective view of the top of the preferred embodiment.

Operation of the flowbench 100 consists of first placing the base orifice 122 upon flow table 106 as shown in FIG. 3. The pneumatic source 101 is then turned on and allowed to reach a stable operating mode. Once stabilized, a pressure differential reading is taken on digital manometer 118. This reading is referred to as $p_1$. Base orifice 122 is then removed and the equipment of interest, for example head H, as seen in FIG. 2, is then installed on support structures 107. Support means, flow table 106, is "snugged" up to head H through adjustment of adjustable pipe 108, the connecting means, which is bolted to flow table 106 by bolts 121 so as to make the connection air tight. Pneumatic source 101 is then started and allowed to stabilize. A reading is then taken on means to measure, digital manometer 118. This reading is referred to as $p_2$. Pneumatic source 101 is then shut off. Head H is then removed from the flow table 106. Operator then replaces base orifice 122 on flow table 106. Small orifice 123 is then nested within base orifice 122. Pneumatic source 101 is restarted and allowed to stabilize. A reading is taken on digital manometer 118. The reading is then used to identify the appropriate size of small orifice 123 which will equate to the same flow pressure (and rate) as the head H, referred to as $p_2$. Once this is accomplished, the operator has identified the air flow restrictor (small orifice) which may then be used to compare the characteristics of head H under the first set of atmospheric conditions, $p_2$, to another head H at a different location and under different atmospheric conditions, $p_3$. Or it may be used to predict the theoretical performance of the head H under the second set of atmospheric conditions, $p_4$.

Regardless of the nature and extent of the difference in the atmospheric conditions, one may obtain an accurate and repeatable comparison between different heads or pieces of equipment in different locations. The comparison may be accomplished by taking the small orifice 123 identified in the foregoing process at the first location to the location of the second head or piece of equipment for comparison to the first. (In the alternative, the operator need only identify the diameter, $\phi$, of the small orifice so that an identical small orifice may be manufactured at the second location.) It is necessary that the flowbench 100 be present at the second location or another identical flowbench 100 be present with a mathematically and physically identical critical flow venturi nozzle 102.

At the second location, the pneumatic source 101 on the identical flow bench is started with the base orifice 122 in place on the flow table 106. This reading is taken and is referred to as $p_3$. The pneumatic source 101 is stopped and the equipment of interest is placed on the flow table 106 and the pneumatic source 101 is restarted. A pressure reading is then taken, referred to simply as p.

Once the four pressure readings have been obtained, that is $p_1$, $p_2$, $p_3$, and p, it is then possible to accurately compare the air flow characteristics and performance of the two heads or pieces of equipment under the two different atmospheric conditions.

THEORETICAL DESCRIPTION

This relationship is generally described as follows:
At atmospheric condition #1:

Volumetric Flow Rate$_{Base\ Orifice\ 1}$=Volumetric Flow Rate$_{Small\ Orifice\ 2}$ (First equipment)

At atmospheric condition #2:

Volumetric Flow Rate$_{Base\ Orifice\ 3}$=Volumetric Flow Rate$_{Small\ Orifice\ 4}$ (Second equipment)

Referring to the Standard Handbook of Engineering Calculations; McGraw-Hill; 1972; pg. 1–201, the following equations relating to the calculation of air flow through orifices and short pipes is used.

| | | Assumptions |
|---|---|---|
| 1. $Q = CA(2gh_v)^{.5}$ were | Q = volumetric flow rate of an orifice | $Q_1 \propto \Delta p_1$ $Q_1 \approx Q_2$ |
| | C = Discharge coefficient of an orifice | $Q_2 \propto \Delta p_2$ $Q_3 \approx Q_4$ |
| | A = Area x-section of the orifice | $Q_3 \propto \Delta p_3$ |
| | g = accel. of gravity | $Q_4 \propto \Delta p_4$ |
| | $h_v$ = $\Delta$ of velocity header | |
| | p = pressure | |
| | $\omega$ = specific weight | |
| | z = elevation | |
| | O = orifice | |
| 2. $Q_1 = C_1A_1(2gh_{v1})^{.5}$ | | |
| 3. $Q_2 = C_2A_2(2gh_{v2})^{.5}$ | | |

It is assumed for the purposes of this analysis that the volumetric flow rate of the two orifices at condition 1 are essentially equivalent, therefore, $Q_1 \approx Q_2$. This results in:

| | |
|---|---|
| 4. $C_1A_1(2gh_{v1})^{.5} = C_2A_2(2gh_{v2})^{.5}$ | $h_v = (p_1 - p_2)/\omega + z_1 - z_2$ $z_1 = z_2$ or $h_v = \Delta p/\omega$ |
| 5. $C_1A_1(2g\Delta p_1/\omega_1)^{.5} = C_2A_2(2g\Delta p_2/\omega_2)^{.5}$ | Condition #1 |
| 6. $C_3A_3(2g\Delta p_3/\omega_3)^{.5} = C_4A_4(2g\Delta p_4/\omega_4)^{.5}$ | Condition #2 |
| | $\omega_1 = \omega_2$ (Condition #1) |
| | $\omega_3 = \omega_4$ (Condition #2) |
| | $A_1 = A_3$ = Base Ring = 2.000" $\phi$ |
| | $A_2 = A_4$ = Small Ring = _ _ _ _ " $\phi$ |
| | $C_1 = C_3$ |
| | $C_2 = C_4$ |

Reduction of equations 5 and 6 with application of the assumptions gives:

$$C_1A_1(2g\Delta p_1/\omega_1)^{-.5}/C_2A_2(2g\Delta p_2/\omega_2)^{-.5}=1$$

and $$C_3A_3(2g\Delta p_3/\omega_3)^{-.5}/C_4A_4(2g\Delta p_4/\omega_4)^{-.5}=1$$

or $$C_1A_1(2g\Delta p_1/\omega_1)^{-.5}/C_2A_2(2g\Delta p_2/\omega_2)^{-.5}=C_3A_3(2g\Delta p_3/\omega_3)^{-.5}/C_4A_4(2g\Delta p_4/\omega_4)^{-.5}$$

or $$(2g\Delta p_1/\omega_1)/(2g\Delta p_2/\omega_2)=(2g\Delta p_3/\omega_3)/(2g\Delta p_4/\omega_4)$$

or $$(\Delta p_1/\omega_1)/(\Delta p_2/\omega_2)=(\Delta p_3/\omega_3)/(\Delta p_4/\omega_4)$$

7. $\Delta p_2/\Delta p_1 = \Delta p_4/\Delta p_3$ or

8. $p_4 = p_3 p_2/p_1$ were $\Delta p_1$=pressure across venturi for base orifice
$\Delta p_2$=pressure across venturi for equipment or small orifice
$\Delta p_3$=pressure across venturi for base orifice
$\Delta p_4$=theoretical pressure across venturi for equipment or small orifice at condition 2

Application of the foregoing equations to an example test situation is illustrated as follows:

| Condition #1: | Base Orifice (K) 42.0" H$_2$O ($p_1$) => Small Orifice (K) 24.3" H$_2$O ($p_2$) | Ratio = .578 = $R_1$ |
|---|---|---|
| Condition #2: | Base Orifice (K) 43.1" H$_2$O ($p_3$) Small Orifice (U) 24.9" H$_2$O ($p_4$) <= | Ratio = .578 = $R_2$ ⇓ |

K = Known
U = Unknown

Air flow conditions are measured at Condition #1 with the flowbench, referred to above as $p_1$ and $p_2$. Application of Eq. 7 results in a pressure ratio of 0.578. Measurement of the air flow rate with an identical flowbench at Condition #2 with the base orifice installed in the flowbench, referred to as $p_3$ is multiplied by the Condition #1 ratio, see Eq. 8, which gives the theoretical air flow rate of the small orifice from Condition #1 at Condition #2, referred to above as $p_4$.

Application of EQ. 8 gives:

$p_4$=(43.1) (24.3)/42.0

$p_4$=24.9 "H$_2$O

This calculation assumes that the frictional losses in the equipment to be measured closely equates to the frictional losses in the small orifice. That is—Friction of Short Pipe (equipment)≈Friction of Orifice.

This value, $p_4$, is compared to the actual flow rate for the second head or piece of equipment under Condition #2 at the second location, p. The head or piece of equipment with the highest reading, calculated or actual, then has the highest flow rate and the best performance of the two. Actual test results are included in FIG. 8 and FIG. 9.

The cabinet of flowbench 100 has doors 109 and 112 attached by hinges 110 and 111. The doors may be opaque or transparent. Exhaust pipe 128 is attached to pneumatic source 101 which vents the air flow outside of the cabinet.

Referring next to FIG. 2 a perspective view of the top of the preferred embodiment shows the equipment testing arrangement. Head H is installed on support structures 107. Flow table 106 is bolted to the bottom of head H by bolts 121. The elevation of flow table 106 is adjusted to tightly mate with head H by movement of adjustable pipe 108. The support structures 107 are installed on the top 113.

Figure 5:
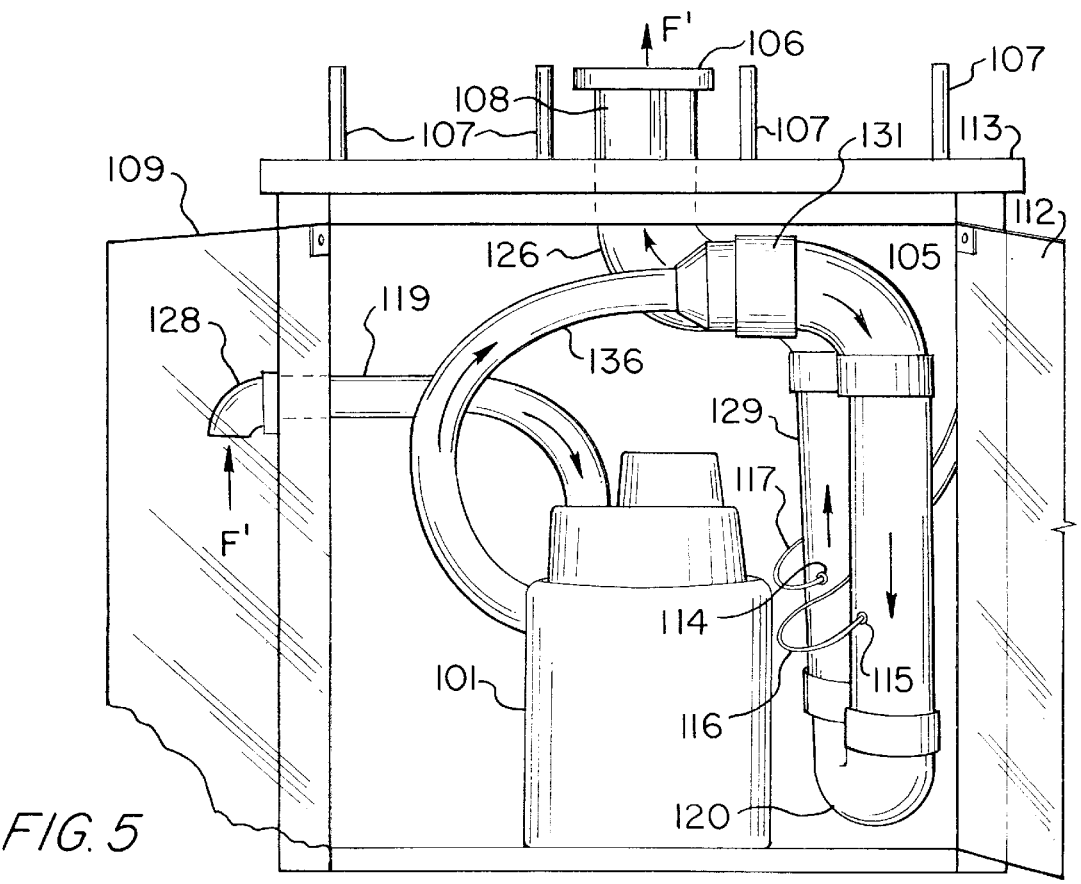
FIG. 5 is an assembled view of an alternate embodiment of a flowbench.

Referring next to FIG. 3 the orientation of the base orifice 122 and small orifice 123 on the flow table 106 is shown. Small orifice 123 is nested within base orifice 122. Both orifices are held in place by the differential pressure created by the air flow F, which is caused by operation of pneumatic source 101. In an alternate embodiment as shown in FIG. 5, the orifices are clamped in place so as to resist air flow $F^1$. Readings may be obtained on digital manometer 118 regardless of the air flow direction through the flow table 106.

Figure 4:
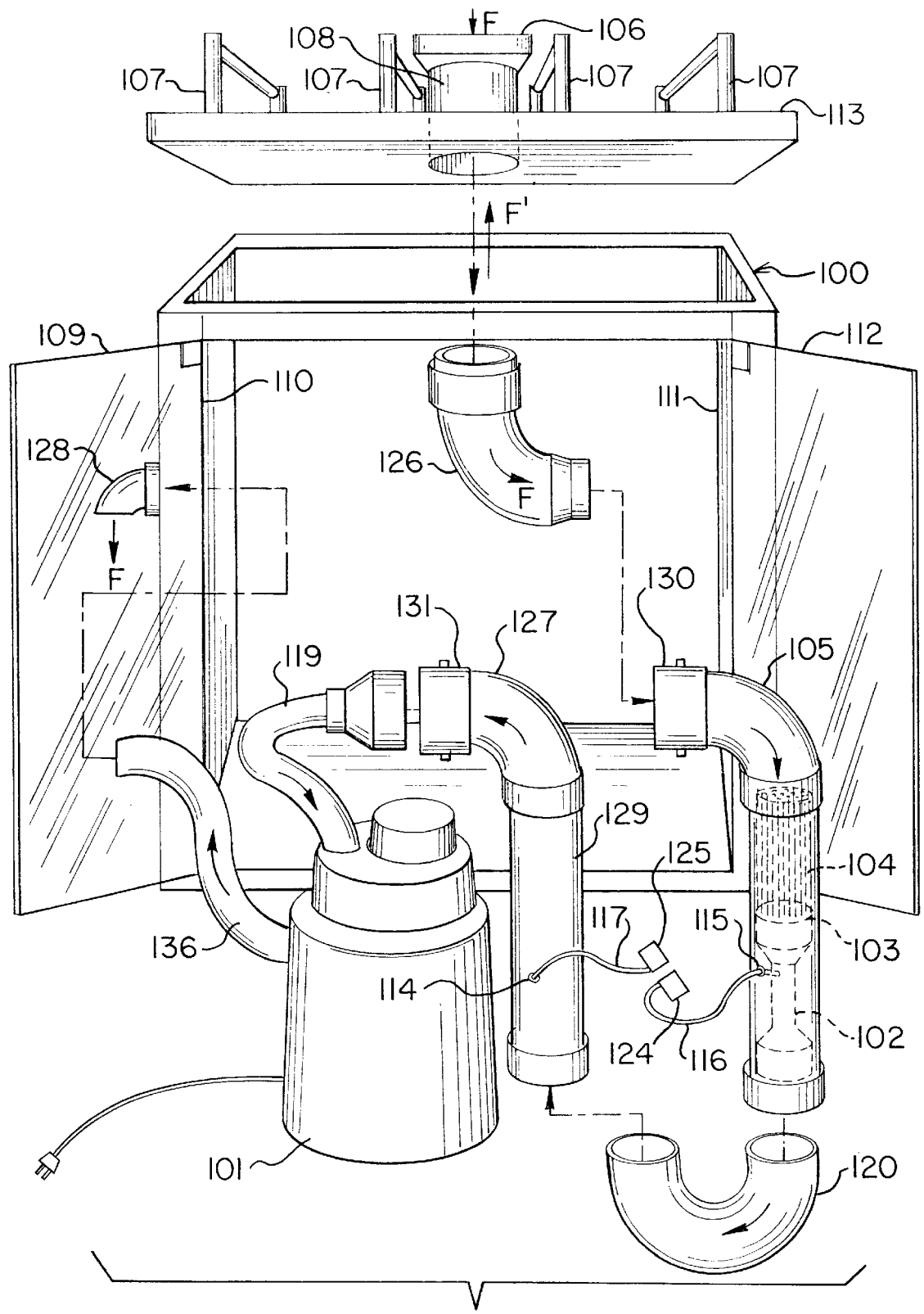
FIG. 4 is an exploded view of the flowbench of FIG. 1.

Referring next to FIG. 4 an exploded view of the present invention shows the connection of pipe 126 and pipe 105 to adjustable pipe 108 and flow table 106, and from the critical flow venturi nozzle 102 to pneumatic source 101 via pipe 119, pipe 120, pipe 129, and pipe 127. The pipe configuration is depicted for the preferred embodiment with air flow F toward pneumatic source 101 from flow table 106. In an alternate embodiment shown in FIG. 5, pipe connector 130 and pipe connection 131 may be broken to reconfigure the pipe so that air flow F is reversed, shown as air flow $F^1$, as shown in FIG. 5.

Referring next to FIG. 5 an assembled view of an alternate embodiment has a pipe configuration resulting in air flow $F^1$. This is accomplished by connecting pipe connector 131 between pipe 136 and pipe 105. Pipe connector 130 connects pipe 126 to pipe 127. During operation air flow $F^1$ enters exhaust pipe 128 and exits flow table 106.

Figure 6:
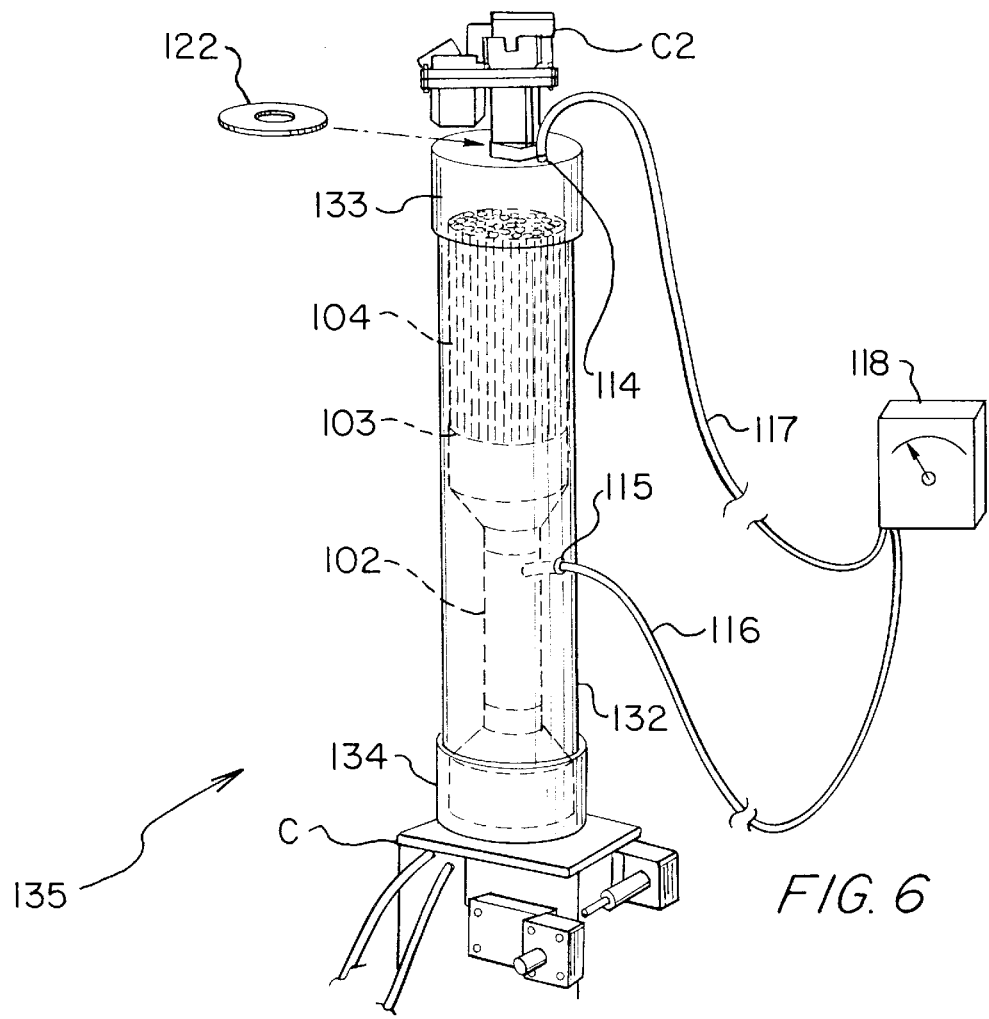
FIG. 6 is a perspective view of a second alternate embodiment.

Referring next to FIG. 6 a perspective view of a second alternate embodiment of the invention is shown. Upstream of the critical flow venturi nozzle 102 contained in pipe 132 is debris screen 103 and flow straightener 104. Atop the pipe 132 is mounting cap 133. At the base of the nozzle is mounting base 134. Mounting base 134 is connected with an air-tight seal to the top of carburetor C. Carburetor C2 is attached to mounting cap 133. Carburetor C2 has a predetermined throat diameter and known physical characteristics. Prior to testing, flow section 135 is installed atop carburetor C. Base orifice 122, which is mounted on mounting cap 133, is installed atop flow section 135. The engine to which carburetor C is mounted is started and operated at a set RPM, (RPM1). Once the air flow through the first engine is stabilized, a reading is taken from digital manometer 118. This is referred to as $p_1$. The pressure signal to the digital manometer 118 is taken from the high-pressure port 114 and low-pressure port 115 by high pressure sensing line 117 and low-pressure sensing line 116. Snubbers 124 and 125 are contained in each sensing line to stabalize the pressure signals. The engine is then shut off and the base orifice 122 is replaced with carburetor C2. The throttle plate of carburetor C is now blocked in the fully open position. The fuel supply to carburetor C is shut off and any remaining fuel is emptied. Carburetor C is now temporarily disabled as a fuel/air metering device, becoming an extension of the engine's intake manifold. The engine is restarted and operated at RPM1, and a reading is taken by the digital manometer 118. This is referred to as $p_2$. By calculating $p_2/p_1=R_1$, an airflow coefficient for the engine is determined.

The flow section 135 may then be taken to the location of another engine to be tested for comparison to the first engine. The same process as described above is performed. Flow section 135 is installed on the carburetor C. First a flow rate is measured with the second engine operating at RPM1 with the base orifice 122 in place of the carburetor C2, referred to as $p_3$. A reading is also taken at RPM1 with the carburetor C2 in place, referred to simply as p. The ratio of $p/p_3=R_2$ is calculated for the second engine. This also allows calculation of the theoretical air flow characteristic of the first engine under the second test atmospheric conditions, $p_4$. This value may then be compared to p, the flow rate of the second engine. As with FIG. 1, test personnel may also, through trial and error, identify an equivalent small orifice 123 which equates to the air flow rate for the first engine under the first set of atmospheric conditions, referred to above as $p_2$. This allows direct comparison of the air flow characteristic of the engine to another engine under the second set of atmospheric conditions.

Figure 7:
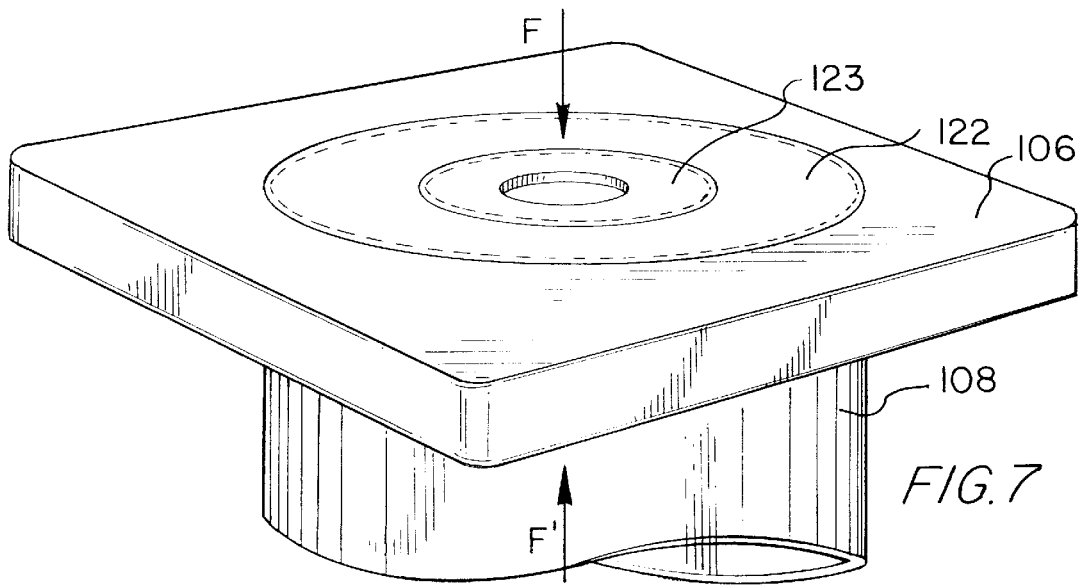
FIG. 7 is a close-up perspective view of the orifices on the flow table.

Referring to FIG. 7 a close-up perspective view of the orifices on the support means flow table 106 showing the air flow restriction means, base orifice 122 resting upon the flow table 106 with air flow F. Small orifice 123, air flow restriction means, is in turn nested within the base orifice 122. In an alternative embodiment, air flow $F^1$ acts to push the orifices off flow table 106. The orifices are held in place by clamp means (not shown).

Figures 8, 9:
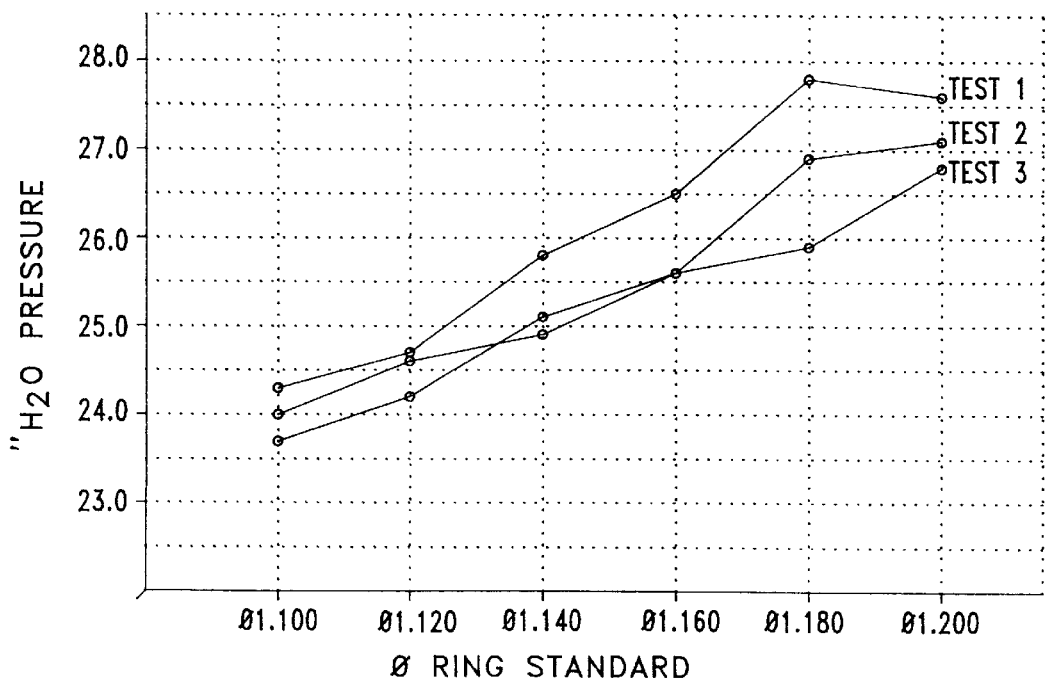
FIG. 8 is a table containing the readings from an actual test.
FIG. 9 is a chart depicting the numerical readings in FIG. 8.

FIG. 8 shows a table containing the readings from an actual test. Referring to "Test 1," the diameter of the test orifices is recorded on the first line. Next as the flowbench is operated, the pressure readings are recorded in the second line. Next the base orifice is placed in the flowbench and the pressure reading is recorded. These readings are then compared to a comparable set of readings taken for another set of orifices at another location or under a different set of atmospheric conditions. The pressure readings in the first line equate to $p_2$ in the preceding analysis. The pressure reading referred to as "base standard" equates to $p_1$ in the preceding analysis. The pressure reading $p_2$ at the first location also equates to the pressure reading for the first piece of equipment. A similar set of readings is taken at the second location for the base orifice, $p_3$, and the second piece of equipment. FIG. 8 depicts three such tests.

FIG. 9 is a chart depicting the numerical readings in FIG. 8. It illustrates the relatively linear nature of the relationship between the diameter of the orifices and the pressure reading from the venturi nozzle.

Although the present invention has been described with reference to preferred embodiments, numerous modifications and variations can be made and still the result will come within the scope of the invention. No limitation with respect to the specific embodiments disclosed herein is intended or should be inferred.

| KEY | |
| --- | --- |
| 100. Flowbench | 124. Snubber |
| 101. Pneumatic source | 125. Snubber |
| 102. Critical flow venturi nozzle | 126. Pipe |
| 103. Debris screen | 127. Pipe |
| 104. Flow straightener | 128. Exhaust pipe |
| 105. Pipe | 129. Pipe |
| 106. Flow table | 130. Pipe connector |
| 107. Support structure | 131. Pipe connector |
| 108. Adjustable pipe | 132. Pipe |
| 109. Door | 133. Mounting cap |
| 110. Hinge | 134. Mounting base |
| 111. Hinge | 135. Flow section |
| 112. Door | 136. Pipe |
| 113. Top | |
| 114. High pressure port | C. Carburetor |
| 115. Low pressure port | C2. Carburetor |
| 116. Low pressure sensing line | F. Air flow |
| 117. High pressure sensing line | $F^1$. Air flow |
| 118. Digital manometer | H. Head |
| 119. Pipe | |
| 120. Pipe | |
| 121. Bolt | |
| 122. Base orifice | |
| 123. Small orifice | |

We claim:

1. A flowbench for comparing relative air flow characteristics of flow restrictions comprising:

restriction standard means having an inlet functioning to cause pneumatic signals;

pneumatic flow means connected to said restriction standard means functioning to cause an air flow;

a first support means connected to said restriction standard means functioning to receive a first air flow restriction means and an unknown flow restriction having an unknown amount of flow restriction;

said first air flow restriction means functioning to cause an air flow pressure pneumatic signal ($p_1$) which is sensed with a sensing means functioning to sense the air flow;

said unknown flow restriction means placed on said first support means functioning to replace said first air flow restriction means;

measuring means functioning to measure an unknown air flow rate pressure pneumatic signal ($p_2$) of said unknown flow restriction;

computation means functioning to calculate a ratio of $p_2/p_1 = R_1$;

a second air flow restriction means functioning to replace said unknown flow restriction means;

said second air flow restriction means functioning to produce a second air flow rate equal to said unknown air flow pressure pneumatic signal ($p=p_2$), thereby providing a simulation orifice (the second air flow restriction means) for an unknown flow restriction means (such as an engine intake manifold).

2. The flowbench for comparing relative air flow characteristics of flow restrictions of claim 1 further comprising:

cabinet means having a door and a top functioning to contain the restriction standard means, pneumatic flow means, first support means, first air flow restriction means, measuring means, and second air flow restriction means; and said first support means having a mounting location on said top and cooperating with said restriction standard means.

3. The flowbench for comparing relative air flow characteristics of flow restrictions of claim 2 further comprising:

adjustable connecting means functioning to connect said first support means to said unknown flow restriction and to support said first flow restriction means.

4. The flowbench for comparing relative air flow characteristics of flow restrictions of claim 3 further comprising:

air flow straightening means connected to said inlet functioning to create a laminar flow.

5. The flowbench for comparing relative air flow characteristics of flow restrictions of claim 4, wherein said means to measure further comprises a digital manometer.

6. The flowbench for comparing relative air flow characteristics of flow restrictions of claim 5, wherein said pneumatic flow means further comprises an air pump.

7. The flowbench for comparing relative air flow characteristics of flow restrictions of claim 6, wherein said restriction standard means further comprises a critical flow venturi nozzle.

8. The flowbench for comparing relative air flow characteristics of flow restrictions of claim 7 further comprising:

said first air flow restriction means further comprising an orifice having a concentric groove on a top surface; and said second air flow restriction means further comprising an orifice removably engaged in the concentric groove.

9. The flowbench for comparing relative air flow characteristics of flow restrictions of claim 8 further comprising a changeable piping means functioning to reverse the air flow through said flowbench.

10. A method to simulate and compare unknown air flow restrictions using a flowbench comprising the steps of:

causing an air flow in a critical flow venturi nozzle having a throat and an inlet;

placing a standard orifice ($O_1$) in the inlet;

meaning a pressure differential between the inlet and the throat ($p_1$);

placing a first unknown flow restriction having an unknown amount of flow restriction in the inlet in place of $O_1$;

measuring the pressure differential between the throat and the inlet ($p_2$);

calculating $p_2/p_1 = R_1$; and selecting an orifice $O_2$ to replace the unknown flow restriction such that the measured pressure differential between the throat and the inlet is equal to $p_2$.

11. The method of claim 10 further comprising using a digital manometer for said measuring.

12. The method of claim 11 further comprising the step of manufacturing the orifice $O_2$ to concentrically mate with the standard orifice $O_1$.

13. The method of claim 10 further comprising the step of connecting a flow straightening means to said inlet.

14. The method of claim 13 further comprising the steps of:

selecting a second flowbench having a critical flow venturi nozzle having an inlet and a throat and having identical physical characteristics to the flowbench;

placing the standard orifice ($O_1$) in the inlet;

causing an air flow through said second critical flow venturi nozzle;

measuring a pressure differential between the inlet and the throat ($p_3$);

placing a second unknown flow restriction having an unknown amount of flow restriction in the inlet in place of the standard orifice ($O_1$);

measuring a pressure differential between the inlet and the throat (p);

calculating the theoretical air flow rate ($p_4$) of said first known flow restriction whereby $p_4 = p_3 R_1$; and comparing the theoretical flow rate ($p_4$) of the first unknown flow restriction to the flow rate of the second unknown flow restriction (p).

15. The method of claim 13 further comprising the steps of:

connecting a second unknown flow restriction having an unknown amount of flow restriction in the inlet in place of $O_1$;

measuring the pressure differential between the throat and the inlet (p);

calculating $p/p_3 = R_2$; and comparing $R_2$ to $R_1$.

16. The method of claim 13 further comprising the steps of:

selecting a second flowbench at a second location having a critical flow venturi nozzle having throat and an inlet and having identical physical characteristics to the flowbench;

duplicating the standard orifice ($O_1$) and the orifice $O_2$ at the second location;

placing the standard orifice ($O_1$) in the inlet;

measuring a pressure differential between the inlet and the throat ($p_3$);

placing a second unknown flow restriction having an unknown amount of flow restriction in the inlet in place of the standard orifice ($O_1$);

measuring a pressure differential between the inlet and the throat (p);

calculating the theoretical air flow rate ($p_4$) of said first unknown flow restriction whereby $p_4=p_3R_1$; and comparing the theoretical flow rate ($p_4$) of the first unknown flow restriction to the flow rate of the second unknown flow restriction (p).

17. A pneumatic system for determining a relative air flow characteristic of a flow restriction using a flowbench comprising:

an air flow inducing means functioning to cause an air flow in a first venturi means comprising a critical flow vent nozzle having an inlet connected to said air flow inducing means function to cause a differential pressure signal;

a measurement means functioning to measure said differential pressure signal;

a first air flow restriction means connected to said first venturi means functioning to cause a differential pressure signal;

said measurement means functioning to measure said differential pressure signal from said first air flow restriction means ($p_1$);

an unknown air flow restriction means functioning to replace said first flow restriction means and cause a differential pressure signal;

said measurement means functioning to measure said differential pressure signal from said unknown air flow restriction means ($p_2$);

a second air flow restriction means functioning to replace said unknown air flow restriction means and functioning to cause a differential pressure signal;

said second air flow restriction means having a size to produce an equal differential pressure between said second air flow restriction means and said unknown air flow restriction means ($p=p_2$);

said measurement means functioning to measure a differential pressure signal (p) from said second air flow restriction means, whereby comparing said differential pressure signal p to said differential pressure signal $p_1$ to said differential pressure signal $p_2$ determines a relative air flow characteristic of said first air flow restriction to said second air flow restriction and said unknown air flow restriction.

18. The system of claim 17, wherein said air flow inducing means further comprises an air pump.

19. The system of claim 17, wherein said measurement means further comprises a digital manometer.

20. The system of claim 19, wherein:

said first air flow restriction means further comprises an orifice; and said second air flow restriction means further comprises an orifice having a concentric engagement with said first air flow restriction means.

21. The system of claim 20 further comprising an air flow straightening means connected upstream of said inlet.

22. The system of claim 21 further comprising interchangeable piping means functioning to reverse the air flow through said flowbench.

23. The system of claim 22 further comprising:

means for using a second flowbench having a second venturi means physically identical to said first venturi means;

means for using said first air flow restriction means upstream of the second venturi means;

means for measuring a pressure differential ($p_3$) with said measuring means;

means for calculating the theoretical air flow rate ($p_4$) of said third air flow restriction means whereby $p_4=p_3R_1$;

means for connecting a fourth air flow restriction means to said second venturi means;

means for measuring a pressure differential (p) with said measuring means; and means for comparing the theoretical air flow rate ($p_4$) of the third air flow restriction means to the air flow rate of the fourth air flow restriction means (p).

24. A method of comparing air flow restrictions at different atmospheric conditions comprising the steps of:

inducing an air flow through a venturi means having an inlet thereby creating a pressure signal;

connecting a first air flow restriction under a first atmospheric condition to said inlet of said venturi means;

meaning the pressure signal $p_1$ with measuring means;

connecting a second air flow restriction under the first atmospheric condition to said inlet of said venturi means;

measuring a pressure signal $p_2$ with said meat means;

calculating ratio $p_2/p_1=R_1$;

connecting said first air flow restriction under a second atmospheric condition to said inlet of said venturi means;

measuring a pressure signal $p_3$ with the measuring means;

connecting a third air flow restriction to said inlet of said venturi means;

measuring a pressure signal p with the measuring means;

calculating a theoretical flow rate $p_4$ of said second air flow restriction under the second atmospheric condition whereby $p_4=p_3R_1$; and comparing said theoretical flow rate $p_4$ to an actual air flow rate of said third air flow restriction under the second atmospheric condition p.

25. The method of claim 24 further comprising the step of using an orifice as said first air flow restriction.

26. The method of claim 25 further comprising the steps of:

using an orifice as said second air flow restriction removeably mated to said first air flow restriction.

27. The method of claim 26 further comprising the step of using a digital manometer for said measuring means.

28. A method to compare unknown air flow restrictions comprising:

inducing an air flow through a critical flow venturi nozzle having a throat and an inlet and having a pressure differential;

placing a standard orifice ($O_1$) in the inlet;

measuring a pressure differential ($p_1$) between the throat and the inlet with meaning means;

placing a first unknown air flow restriction having an unknown amount of flow restriction in the inlet in place of $O_1$;

measuring a pressure differential ($p_2$) between the throat and the inlet with said measuring means;

calculating $p_2/p_1=R_1$;

selecting an orifice $O_2$ to replace the first unknown air flow restriction thereby creating a pressure differential equal to $p_2$;

placing the standard orifice ($O_1$) under a second atmospheric condition upstream of the throat;

measuring a pressure differential ($p_3$) between the throat and the inlet with said measuring means;

calculating a theoretical flow rate ($p_4$) of said firs unknown flow restriction under the second atmospheric condition whereby $p_4=p_3R_1$;

placing a second unknown flow restriction having an unknown amount of flow restriction in the inlet;

measuring a pressure differential (p) between the throat and the inlet with said measuring means; and comparing the theoretical flow rate ($p_4$) of the first unknown flow restriction to the flow rate of the second unknown flow restriction (p).

29. The method of claim 28 further comprising the step of using a digital manometer for said measuring means.

30. The method of claim 29 further comprising the step of selecting the orifice $O_2$ to concentrically mate within the standard orifice $O_1$.

31. The method of claim 28 further comprising the step of using an air flow straightening means connected to said inlet functioning to cause laminar flow in the throat.

32. The method of claim 31 further comprising the step of using piping means functioning to reverse the direction of said air flow.

33. A method for determining relative air flow characteristics of unknown flow restrictions comprising:

mounting an outlet of a first critical flow venturi nozzle having a throat, an inlet, and an outlet on a first unknown flow restriction;

placing a first flow restriction in the inlet having a pressure differential;

causing an air flow through said first critical flow venturi nozzle;

measuring a pressure differential ($p_1$);

removing said first flow restriction from the inlet;

placing a known flow restriction upon said inlet of said first critical flow venturi nozzle functioning to cause a pressure differential;

causing an air flow through said first critical flow venturi nozzle;

measuring a pressure differential ($p_2$);

calculating $p_2/p_1=R_1$; and selecting a second flow restriction which concentrically mates with said first flow restriction, whereby a pressure differential of said second flow restriction is equal to $p_2$.

34. The method of claim 33 further comprising the steps of:

mounting the outlet of said first critical flow venturi nozzle on a second unknown flow restriction having an unknown amount of flow restriction;

placing a duplicate of said first flow restriction in the inlet functioning to cause a pressure differential;

causing an air flow through said first critical flow venturi means;

measuring the pressure differential ($p_3$);

removing said first flow restriction from the inlet;

placing said known flow restriction upon said inlet of said first critical flow venturi nozzle functioning to cause a pressure differential;

causing an air flow through said first critical flow venturi means;

measuring the pressure differential p;

calculating the theoretical flow rate of the first unknown flow restriction $p_4$ whereby $p_4=p_3p_2/p_1$;

comparing said pressure differential $p_4$ to pressure differential p;

calculating $p_3/p=R_2$; and comparing $R_1$ to $R_2$.

35. The method of claim 34 further comprising the step of using an engine to cause said air flow.

36. The method of claim 35 further comprising the step of using a digital manometer to measure said pressure differential.

37. The method of claim 36 further comprising the step of using an orifice as said first flow restrictor.

38. The method of claim 37 further comprising the step of using an orifice as said second flow restriction which concentrically mates with said first flow restriction.

39. The method of claim 38 further comprising the steps of:

using a first engine carburetor as said first unknown flow restriction; and using a second engine carburetor as said second unknown flow restriction; and using a carburetor as said known flow restriction.

40. The method of claim 39 further comprising the steps of:

using flow straightening means connected to the inlet of said first critical flow venturi nozzle.

41. Apparatus for simulating and determining relative air flow characteristics of flow restrictions comprising:

air flow generator means functioning to cause an air flow in a critical flow venturi nozzle, said venturi nozzle having a throat, an inlet, and an outlet connected to an engine carburetor;

a first flow restriction means connected to the inlet functioning to cause a pressure differential between the throat and the inlet ($p_1$);

measuring means functioning to measure the pressure differential ($p_1$) between the throat and the inlet;

a known flow restriction means connected to said inlet functioning to cause a pressure differential between the throat and the inlet; and a second flow restriction means in place of said known flow restriction functioning to cause a second pressure differential ($p_2$), whereby $p_1$ and $p_2$ are compared.

42. The apparatus of claim 41, wherein said air flow generator further comprises an engine.

43. The apparatus of claim 42, wherein said measuring means further comprises a digital manometer.

44. The apparatus of claim 43, wherein said first flow restriction means further comprises an orifice.

45. The apparatus of claim 44, wherein said second flow restriction means further comprises an orifice having a concentric engagement to said first flow restriction means.

46. The apparatus of claim 45, wherein said known flow restriction means further comprises a carburetor.

47. The apparatus of claim 46 further comprising flow straightening means connected to the inlet of said critical flow venturi nozzle functioning to create a laminar flow in said throat.

* * * * *